United States Patent
Godse et al.

(10) Patent No.: US 7,100,095 B2
(45) Date of Patent: Aug. 29, 2006

(54) SYSTEM AND METHOD FOR FAULT NOTIFICATION AND CORRELATION

(75) Inventors: Dhananjay Godse, Kanata (CA); Geoff Nichols, Dunrobin (CA); Louie Kwan, Nepean (CA)

(73) Assignee: CIENA Corporation, Linthicum, MD (US)

( * ) Notice: Subject to any disclaimer, the term of this patent is extended or adjusted under 35 U.S.C. 154(b) by 530 days.

(21) Appl. No.: 10/374,671

(22) Filed: Feb. 24, 2003

(65) Prior Publication Data

US 2004/0078629 A1 Apr. 22, 2004

(30) Foreign Application Priority Data

Feb. 25, 2002 (CA) ................................ 2373211

(51) Int. Cl.
*G06F 11/00* (2006.01)
*G06F 15/173* (2006.01)
*G05B 9/02* (2006.01)

(52) U.S. Cl. ............................. 714/48; 700/79; 709/223
(58) Field of Classification Search ................ 714/57; 718/102, 105; 709/208, 209, 210, 223, 224, 709/706, 714; 700/28
See application file for complete search history.

(56) References Cited

U.S. PATENT DOCUMENTS

| | | | |
|---|---|---|---|
| 4,654,655 A * | 3/1987 | Kowalski | 340/825.5 |
| 5,521,958 A | 5/1996 | Selig et al. | |
| 5,664,093 A | 9/1997 | Barnett et al. | |
| 5,923,845 A | 7/1999 | Kamiya et al. | |
| 6,012,152 A | 1/2000 | Douik et al. | |
| 6,499,117 B1 * | 12/2002 | Tanaka | 714/49 |
| 6,810,496 B1 * | 10/2004 | Vittal | 714/57 |
| 6,948,101 B1 * | 9/2005 | Saito | 714/43 |
| 2002/0029266 A1 * | 3/2002 | Tse et al. | 709/224 |
| 2003/0009711 A1 * | 1/2003 | Kuhn et al. | 714/57 |
| 2003/0076781 A1 * | 4/2003 | Enomoto et al. | 370/229 |
| 2004/0205420 A1 * | 10/2004 | Seeley et al. | 714/57 |

* cited by examiner

*Primary Examiner*—Anthony Knight
*Assistant Examiner*—Jennifer L. Norton
(74) *Attorney, Agent, or Firm*—Merek, Blackman & Voorhees, LLC

(57) ABSTRACT

In a communications network, a system and method for fault notification and correlation. The system includes a notification collector that serves as an intermediary for processing fault notifications. If the fault notification volume exceeds a defined threshold, such that in the prior art could involve dropped notifications, the notification collector processes the critical fault notifications. The notification collector may also assign a higher priority to processing the fault notifications than the faulty components do for generating the fault notifications. In this manner, the need for a fault correlation subsystem is reduced.

8 Claims, 1 Drawing Sheet

SYSTEM AND METHOD FOR FAULT NOTIFICATION AND CORRELATION

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to networking systems and specifically to a system and method for reporting and correlating network faults for network fault management.

Telecommunications networks often consist of a large number of distinct components and sub-systems, referred to as managed entities, that require configuration and monitoring. The state of a particular managed entity often depends on, and is partially driven by, the states of other managed entities.

When each of the managed entities change state, they often have to notify a management system of the state change. The state change is communicated to the management system by a Simple Network Management Protocol (SNMP) notification, for example. Since managed entities often depend on the state of other managed entities to determine their current state, a state change in one managed entity could cause state changes in tens of other managed entities, and could therefore trigger a cascade of tens or hundreds of notifications to the management system.

As a result, such a large number of notifications can potentially create a broadcast storm and flood the management system. In the case of an external management system, the communication channel between a node in the telecommunication network and management system can become severely congested due to the high number of notifications, thus reducing the overall throughput of the telecommunication network. Furthermore, a flood of notifications may cause one or more of the notifications to be dropped. In such a case, the management system will be unaware of the problems at the nodes corresponding to the dropped notifications.

Therefore, it is an object of the present invention to obviate or mitigate the above-mentioned disadvantages.

BRIEF SUMMARY OF THE INVENTION

In accordance with an aspect of the present invention, there is provided a network fault management system for managing a plurality of managed entities. Ones of the managed entities have a predefined dependency relationship with others of the managed entities. The network fault management system includes the following elements. A management system manages the plurality of managed entities. A local notification collector receives fault notifications generated by corresponding ones of the managed entities in response to a fault, and reports the fault notifications to the management system, thereby reducing the likelihood of dropping fault notifications.

BRIEF DESCRIPTION OF THE DRAWINGS

An embodiment of the present invention will now be described by way of example only with reference to the following drawings in which.

DETAILED DESCRIPTION OF THE INVENTION

Figure 1:
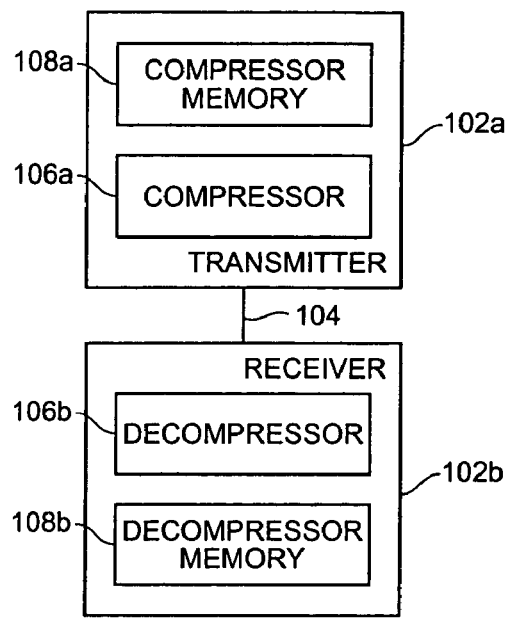
FIG. 1 is a block diagram of a network of managed entities.

For convenience, like numerals in the description refer to like structures in the drawings. As previously described, many telecommunications networks include distinct components and sub-systems that require management by a management system. These component and sub-systems are referred to as managed entities. The management system is a remote entity that observes and configures one or more telecommunication networks. Managed entities include hardware components, physical interfaces, logical interfaces and services. Managed entities typically have interfaces to include or exclude them from the telecommunication network, and to display state information, statistics, and configuration parameters. Managed entities have a cohesive data set that describes and configures them, and may have state behavior that is influenced by operating stimuli.

A managed entity is often related to other managed entities in a dependency relationship. The relationship includes referential integrity between a dependent entity and an entity upon which it depends, referred to as the "dependee". The referential integrity is generally in the form of a foreign key, which is an attribute (or group of attributes) that is used to refer to a primary key of a dependee. The primary key is an attribute (or group of attributes) that uniquely identifies the dependee. Further, there is often a state observation relationship as described by the "observer" pattern detailed in the 1995 book "Design Patterns" by Erich Gamma, Richard Helm, Ralph Johnson, and John Vlissides.

An example of the relationship between dependent and dependee managed entities is illustrated as follows. Referring to FIG. 1, a portion of a telecommunication network is illustrated generally by numeral 100. The illustrated portion 100 includes a management system 108, a pair of asymmetric digital subscriber loop (ADSL) channels 106, an ADSL physical line 104, and a line card 102. The two ADSL channels 106 are multiplexed over the ADSL physical line 104, which is coupled to the line card 102. Thus, the ADSL channels 106 are dependent on the ADSL physical line 104, which is dependent on the line card 102.

The primary key for the line card 102 is <shelf, slot> and the primary key for the ADSL physical line 104 is <shelf, slot, port>. It can be seen that there is referential integrity between the <shelf, slot> portion of the primary key of the ADSL physical line 104 and the <shelf, slot> of the primary key of the line card 102. Thus, the <shelf, slot> portion of the ADSL physical line primary key is referred to as the foreign key. If the state of the line card 102 is "inactive", the state of the ADSL physical line 104 is also "inactive" because of their dependency.

Similarly, the primary key for the ADSL channel 106 is <shelf, slot, port, type>. The <shelf, slot> portion of the ADSL channel primary key is the same as the <shelf, slot> primary key of the line card 102 to which the ADSL channel 106 is coupled. The <shelf, slot, port> portion of the ADSL channel primary key is the same as the <shelf, slot, port> primary key of the ADSL physical line 104 on which the ADSL channel 106 is multiplexed. Thus, if the state of either the line card 102 or the ADSL physical line 104 is "inactive", the state of the ADSL channel 106 is also "inactive" because of their dependency.

Thus it can be seen that if the line card 102 deactivates, the associated ADSL physical line 104 deactivates, as do the ADSL channels 106, which can result in hundreds of fault notifications. For example, although only one line card 102 and two channels 106 are labeled in FIG. 1, it is not uncommon for a line card 102 to be coupled to 24 ADSL physical lines 104 and for each ADSL physical line 104 to have one or two ADSL channels 106. Further, each ADSL channel 106 may be coupled to an Asynchronous Transfer Mode (ATM) interface (not shown). Thus, if a line card 102 goes down, it changes state. Each of the 24 ADSL physical lines 104 also has to change state. Each of the ADSL channels 106 also has to change state. Each ATM interface (not shown) also has to change state. As a result, between 73 and 121 notifications may be generated for one deactivated line card 102, depending on the number of ADSL channels 106 per line. However, when this many notifications are sent, the management system can lose messages, thus giving it an incorrect picture of the system.

Figure 2:
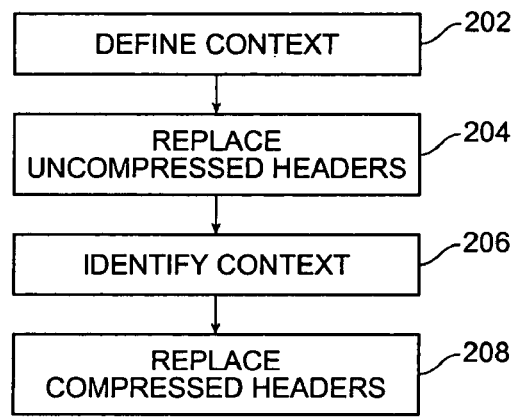
FIG. 2 is a block diagram of a notification collector according to an embodiment of the present invention.

The number of notifications sent when a managed entity fails may be reduced as follows, with reference to FIG. 2, which is a block diagram showing a notification collector according to an embodiment of the present invention. Managed entities that depend on other managed entities register at initialization or provisioning time with the dependee entity for state change notifications. Typically, the management system 108 configures the managed entities and, thus, is aware of the system configuration. Managed entities that are a root cause of a state change send a state change notification 202 to a local notification collector 204 on the system. Since the notification collector 204 is a local network component, it can avoid the message flooding problem of the prior art by appropriately programming its task priority setting. That is, the notification collector 204 is assigned a higher task priority than all other tasks that generate notifications. Since the notification collector 204 is assigned a higher task priority than the managed entities, the managed entities will not be able to generate a notification while notification collector 204 is processing a notification. Therefore, the notification collector 204 will be able to process the notifications faster than they can be generated. The identity transmitted by the managed entity to the notification collector 204 includes its own identity as well as the identity of the managed entity that is the root cause of the state change. In this case, both identities are the same.

The managed entity also sends an internal state change message to all managed entities that depend on it, with its own identity as the root cause. Each dependent managed entity so notified sends a state change notification 202 to the notification collector 204. The notification 202 includes the identity of the managed entity that is the root cause of the state change and the identity of the managed entity sending the notification 202. In this case, the identities are different.

The dependent managed entities also send and internal state change notifications to their own dependent managed entities, along with the identity of the entity that was the root cause of the fault. Each dependent managed entity so notified sends a state change notification 202 to the notification collector 204. The notification 202 includes the identity of the managed entity that is the root cause of the state change and the identity of the managed entity sending the notification 202. In this case, the identities are different. This process continues until all dependent, managed entities have been notified and have notified the notification collector.

The notification collector 204 sends the received notifications 202 to the management system 108. If there are too many notifications to send, the notification collector 204 discards any notifications where the root cause identifier is not the same as the entity that sent the notification. A threshold is defined for determining what constitutes too many notifications. The threshold is programmable and is determined by a system operator as will be appreciated by a person skilled in the art. Generally, the threshold depends on the bandwidth of the communication link, the capacity of the management system 108, and the amount of notification buffers on the system.

The discarding of notifications is an effective notification filtering mechanism because, as previously described, the management system 108 is aware of the system configuration and dependencies between managed entities. Thus, the management system 108 is programmed to deduce the state changes of the dependent managed entities from the system configuration. In the present embodiment, the management system 108 includes codified fault correlation rules encapsulating associated managed entities in a directed acyclic state dependency graph, as illustrated in FIG. 1. In the diagram, managed entities are represented as nodes and dependency relationships as unidirectional edges. As previously described, dependents (represented by a tail of the graph edge) register with dependees (represented by an arrowhead of the graph edge) for state change notifications.

Continuing the example previously described, if the line card 102 is faulty, a state change notification 202 is sent to the notification collector 204 with the identity of the line card 102 as the root cause. The line card 102 also notifies each of the ADSL physical lines 104, and each of them deactivates. Each of the ADSL physical lines 104 sends a notification 202 to the notification collector 204 with the identity of the line card 102 as the root cause. Each ADSL physical line 104 notifies its dependent ADSL channels 106. Each of the ADSL channels 106 sends a notification 202 to the notification collector 204 with the identity of the line card 102 as the root cause. Each ADSL channel 106 notifies its dependent ATM interface (not shown), and each ATM interface (not shown) sends a state-change notification 202 to the notification collector 204 with the identity of the line card 102 as the root cause.

Therefore, the notification collector 204 has between 73 and 121 notifications to send to the management system 108. If that number is above the threshold that defines "too many", only the line card state change notification is sent to the management system 108 because that notification is the case where the root cause identity is the same as the notification sender identity. The management system 108 can deduce the corresponding state change in the ADSL physical lines, the ADSL channels, and the ATM interfaces accordingly.

Figure 3:
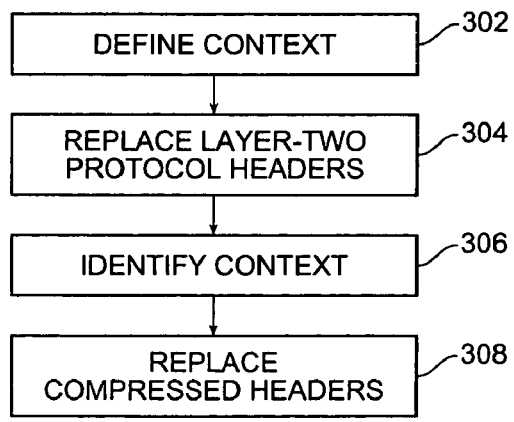
FIG. 3 is a flowchart of a method according to an embodiment of the present invention.

FIG. 3 is a flowchart summarizing the steps performed by a system that includes a notification collector according to an embodiment of the present invention. (More detail on these steps is provided above with reference to FIG. 2.) When the network is configured, some of the managed entities have a predefined dependency relationship with others of the managed entities. In step 302, each of the managed entities is registered with a dependee. In step 304, when a fault is detected, a notification is transmitted from a faulty entity to receiving entities. The receiving entities are all those entities dependant on the faulty entity. In step 306, upon receipt of the notification, a further notification is transmitted from each of the receiving entities to all managed entities dependant on those receiving entities. In step 308, step 306 is repeated until all dependant entities have been notified, thereby removing the need for a fault correlation subsystem.

The system described above inhibits a single fault from causing a storm of fault notifications. This is achieved by tagging notification events with the identity of the root cause of the fault. As a result, congestion of the communication channel to the management system 108 is reduced, as the notification collector 204 decides whether or not to filter out notifications that are not sent by the managed entity that is the root cause of the problem. The management system 108 deduces the rest of the state changes in the system using its knowledge of the system configuration and the relationships between managed entities. Thus, the correct states of all managed entities managed by the management system 108 can be reflected with a minimum number of notifications.

A further advantage of the system described above is that it eliminates the need for a fault correlation subsystem. Typically, fault correlation is performed by a fault correlation subsystem, which operates as follows. The managed entity fault is sent to the fault correlation system. The fault correlation system runs rules based on a system configuration, and updates the visible state of the managed entities.

However, this approach is error-prone because the state correlation logic has to be coded twice, once in the managed entity control software and once in the fault-correlation subsystem. Having two components of software calculating the same state information is risky because it may not produce the same results. Thus, having each managed entity report to the dependee that it received status notifications, reduces the need for a fault correlation subsystem.

Although the invention has been described with reference to certain specific embodiments, various modifications thereof will be apparent to those skilled in the art without departing from the spirit and scope of the invention as outlined in the claims appended hereto.

What is claimed is:

1. A network fault management system for reporting and correlating network faults, comprising:
 a local notification collector for receiving fault notifications generated by managed entities;
 said managed entities include distinct components and sub-systems;
 said local notification collector is a local network component which is programmable to avoid fault notification flooding by programming its task priority setting to a higher task priority than all other tasks that generate fault notifications thereby preventing managed entities from generating fault notifications while said notification collector is processing a fault notification,
 each of said managed entities includes its own identity,
 a state change occurs when one of said managed entities goes from a fully functioning state to a fault state,
 when a state change of a managed entity occurs, notification of the state change and the identity of said managed entity are transmitted to said notification collector,
 when a state change of a managed entity occurs, said managed entity sends a state change message to all dependant managed entities that depend on said managed entity along with the identity of the managed entity which was the root cause of the fault state,
 said notification collector sends notifications of state change to a management system, and
 said notification collector includes a programmable threshold;
 said programmable threshold depends upon bandwidth of the communication link, capacity of the management system and amount of notification buffers.

2. The network fault management system as set forth in claim 1, wherein:
 when said notification collector sends notifications of state change to said management system, said collector filters said notifications where the identity of said managed entity is not the same as the root cause entity.

3. The network fault management system as set forth in claim 2 wherein:
 said management system is programmed to be aware of dependant entities and deduce state changes of dependant entities from the system configuration.

4. The network fault management system as set forth in claim 1 wherein:
 said management system includes codified fault correction rules encapsulating managed entities in a directed acyclic state dependency graph.

5. A method of network fault management for reporting and correlating network faults, comprising the steps of:
 collecting fault notifications using a local notification collector for receiving fault notifications generated by managed entities wherein said managed entities include distinct components and sub-systems;
 programming said local notification collector to avoid fault notification flooding by programming its task priority setting to a higher task priority than all other tasks that generate fault notifications thereby preventing managed entities from generating fault notifications while said notification collector is processing a fault notification,
 providing each of said managed entities with its own identity,
 a state change occurs when one of said managed entities goes from a fully functioning state to a fault state
 notifying of the state change and the identity of said managed entity by transmitting to said notification collector when a state change of a managed entity occurs,
 when a state change of a managed entity occurs, sending from said managed entity a state change message to all dependant managed entities that depend on said managed entity along with the identity of the managed entity which was the root cause of the fault state,
 sending from said notification collector notifications of state change to a management system, and
 said notification collector includes a programmable threshold;
 said programmable threshold depends upon bandwidth of the communication link, capacity of the management system and amount of notification buffers.

6. The method of network fault management as set forth in claim 5, wherein:
 when said notification collector sends notifications of state change to said management system, said collector filters said notifications where the identity of said managed entity is not the same as the root cause entity.

7. The method of network fault management as set forth in claim 6, further comprising the step of:
 programming said management system to be aware of dependant entities and deduce state changes of dependant entities from the system configuration.

8. The method of network fault management as set forth in claim 5, further comprising the step of:
 codifying fault correction rules in said management system for encapsulating managed entities in a directed acyclic state dependency graph.

* * * * *